(12) United States Patent
Wakui

(10) Patent No.: US 6,256,060 B1
(45) Date of Patent: *Jul. 3, 2001

(54) STILL VIDEO CAMERA SYSTEM WITH REMOTE CONTROLLER

(75) Inventor: Yoshio Wakui, Tokyo (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,554

(22) Filed: May 16, 1997

(30) Foreign Application Priority Data

May 17, 1996 (JP) .................................... 8-148231

(51) Int. Cl.[7] .................................... H04N 5/232
(52) U.S. Cl. .......................... 348/211; 348/374; 348/375
(58) Field of Search ..................... 348/207, 211, 348/212, 213, 214, 216, 220, 221, 222, 231, 239, 373, 374, 375, 376; H04N 5/225

(56) References Cited

U.S. PATENT DOCUMENTS

| | | | |
|---|---|---|---|
| 4,837,817 | * 6/1989 | Maemori | 348/211 |
| 5,146,353 | * 9/1992 | Isoguchi et al. | 348/220 |
| 5,179,446 | * 1/1993 | Hong | 348/224 |
| 5,231,501 | 7/1993 | Sakai . | |
| 5,325,143 | 6/1994 | Kawano . | |
| 5,438,359 | 8/1995 | Aoki . | |
| 5,530,473 | 6/1996 | Sakai et al. . | |
| 5,748,238 | * 5/1998 | Wakabayashi et al. | 348/211 |
| 5,815,205 | * 9/1998 | Hashimoto et al. | 348/373 |

* cited by examiner

Primary Examiner—Tuan Ho
(74) Attorney, Agent, or Firm—Greenblum & Bernstein, P.L.C.

(57) ABSTRACT

A still video camera system including a still video camera and a remote controller for remotely operating the still video camera by transmitting a control signal to the still video camera. The remote controller is detachably coupled to the still video camera, and when the remote controller is coupled to the still video camera, a signal transmission device of the remote controller is utilized for transmitting the image data to an external device.

16 Claims, 9 Drawing Sheets

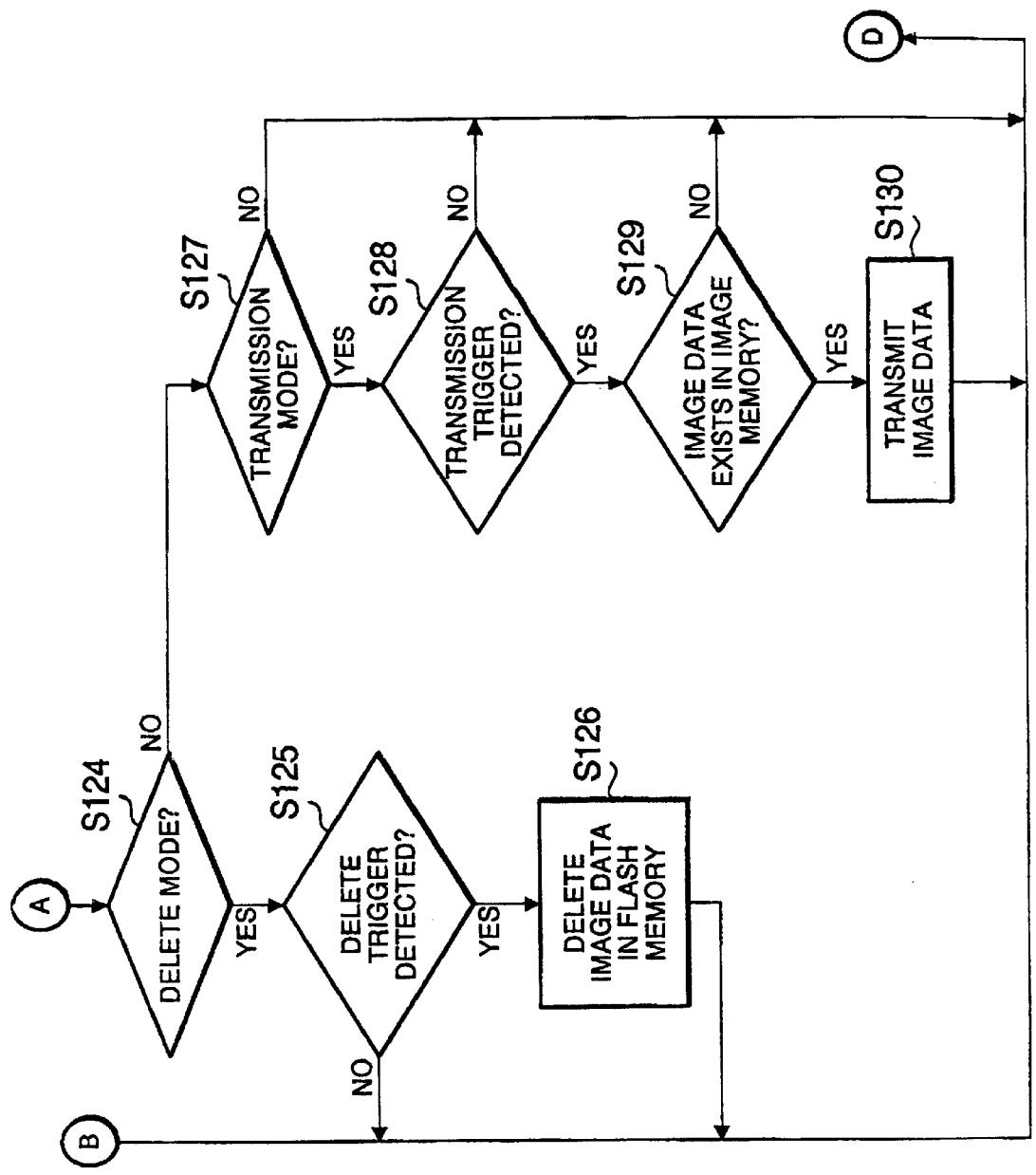

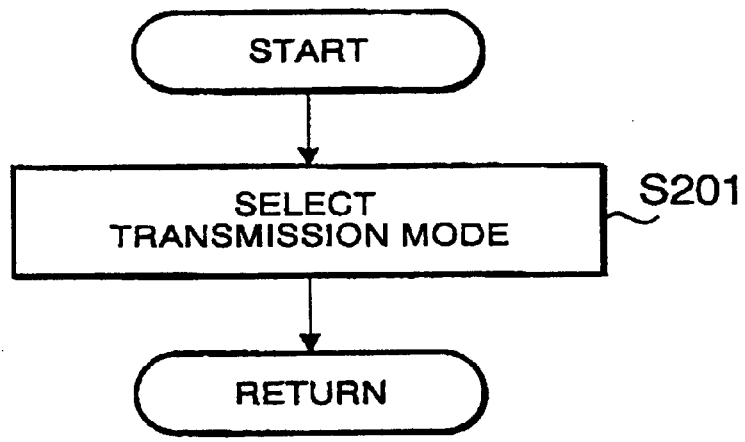
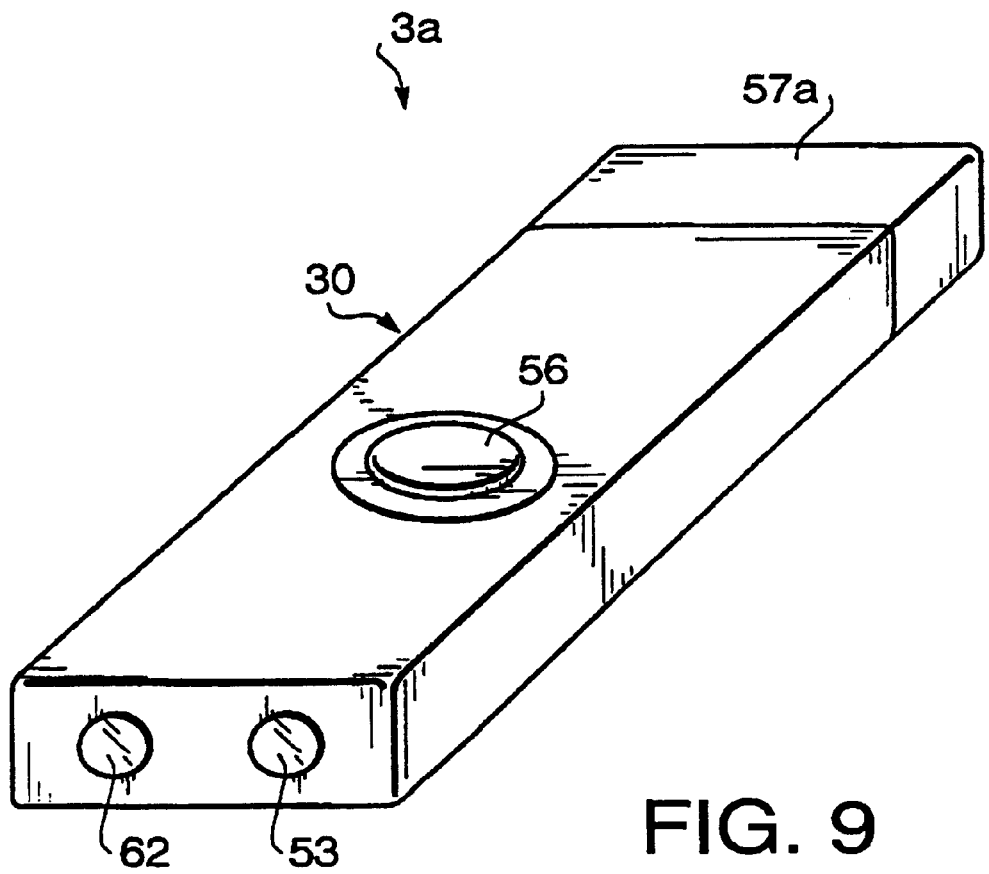

STILL VIDEO CAMERA SYSTEM WITH REMOTE CONTROLLER

BACKGROUND OF THE INVENTION

The present invention relates to a still video camera system including a still video camera and a remote controller.

Conventionally, a still video camera system, including a still video camera and a remote controller for controlling the still video camera to perform a photographing operation, has been known.

Generally, in such a still video camera, a built-in rewritable non-volatile memory is provided, and the image data of photographed objects is stored in the memory.

The number of frames recordable in such a non-volatile memory is limited. Accordingly, if there is not enough room for storing a new data, at least a part of the data which has already been stored in the memory should be deleted in order to perform another photographing.

To deal with this problem, the data stored in the memory of the camera is transferred to an external device, such as a personal computer or the like. However, in order to transfer the data, conventionally, an extra transmission device should be incorporated in the camera, or should be attached to the camera, which complicates the structure of the camera and/or increases the cost of the camera system.

SUMMARY OF THE INVENTION

It is therefore an object of the invention to provide a still video camera system which allows the data stored in the memory of the camera to be transmitted without complicating the structure thereof.

For the above object, according to an aspect of the invention, there is provided an image data processing system including an image data processing apparatus and a remote controller for controlling operations of the image processing apparatus. The remote controller is detached from or coupled to the image data processing apparatus. The image data processing apparatus comprises a signal receiving device which receives a control signal transmitted from the remote controller; and a data storage, which stores image data. The remote controller comprises a signal transmitting device, which transmits the control signal. The image data processing apparatus further comprises a controller which controls the signal transmitting device, based on the image data stored in the data storage, to transmit a signal carrying the image data to an external apparatus when the remote controller is coupled to the image data processing apparatus.

According to another aspect of the invention, there is provided an image data processing system including an image data processing apparatus and a remote controller for controlling operation of the image data processing apparatus, said remote controller being detached from or coupled to said image data processing apparatus. The image data processing apparatus comprises a signal receiving device which receives a control signal transmitted from the remote controller; a controller which controls operations of the image data processing apparatus in accordance with signal received by the signal receiving device; a data storage, which stores an image data; data output terminals, through which the image data stored in the data storage can be output. The remote controller comprises data input terminals; a signal transmitting device, the signal transmitting device transmitting signal carrying the image data stored in the data storage to an external apparatus when the data input terminals and the data output terminals are electrically connected and the image data is transmitted from the data output terminals through the data input terminals when the remote controller is coupled to the image data processing apparatus.

Optionally, the image data processing apparatus may include a still video camera which captures an image of an object and stores an image data of the object in the data storage.

Preferably, the signal transmitting device is capable of transmitting the control signal.

Optionally, the remote controller may include a second signal receiving device, which receives signal transmitted from the external device.

Further, the external device may transmit a signal indicative of received status of the signal transmitted from the signal transmitting device.

Alternatively, the signal receiving device may receive a signal indicative of received signal status that is transmitted from the external device.

Further optionally, the still video camera is operable in either one of a recording mode, a reproducing mode, or a data transmission mode in which the image data is to be transmitted to the external device, and wherein the still video camera is provided with a manually operable member which is used to select one of the operation modes.

Optionally, the still video camera is provided with a sensor which detects whether the remote controller is coupled to the still video camera, and wherein the controller selects the transmission mode when the sensor detects that the remote controller is coupled to the still video camera.

Alternatively, the still video camera is provided with a sensor which detects whether the remote controller is coupled to the still video camera, and wherein the controller inhibits selection of the transmission mode if the sensor detects that the remote controller is not coupled to the still video camera.

Further optionally, the still video camera comprises a body, an insertion slot for receiving the remote controller being formed on the body.

Preferably, a direction in which the receiving element is directed and a direction in which the signal transmitting device is directed when the remote controller is inserted in the insertion slot of the body are substantially the same.

Optionally, the signal receiving device receives an infrared light signal.

Still optionally, the signal transmitting device transmits an infrared light signal.

According to further aspect of the invention, there is provided a still video camera system, comprising: a still video camera and a remote controller. The remote controller includes a signal transmitting device, the signal transmitting device being used for transmitting signal to control operation of the still video camera, and a connector for connecting the remote controller to the still video camera. The still video camera has a memory for storing image data, and a receptor connector to which the connector of the remote controller is connected. The still video camera system further comprises data transmitting system which transmits data stored in the memory to an external device by way of the signal transmitting device of the remote controller when the connector of the remote controller and the receptor connector of the still video camera are connected.

DESCRIPTION OF THE ACCOMPANYING DRAWINGS

FIGS. 5, 6 and 7 show a flowchart illustrating an operation of the still video camera;

FIG. 8 is a flowchart of a remote controller insertion process;

FIG. 9 Is a perspective view of a remote controller according to a second embodiment of the invention.

DESCRIPTION OF THE EMBODIMENT

Hereinafter, the invention will be described with reference to the accompanying drawings.

Figure 1:
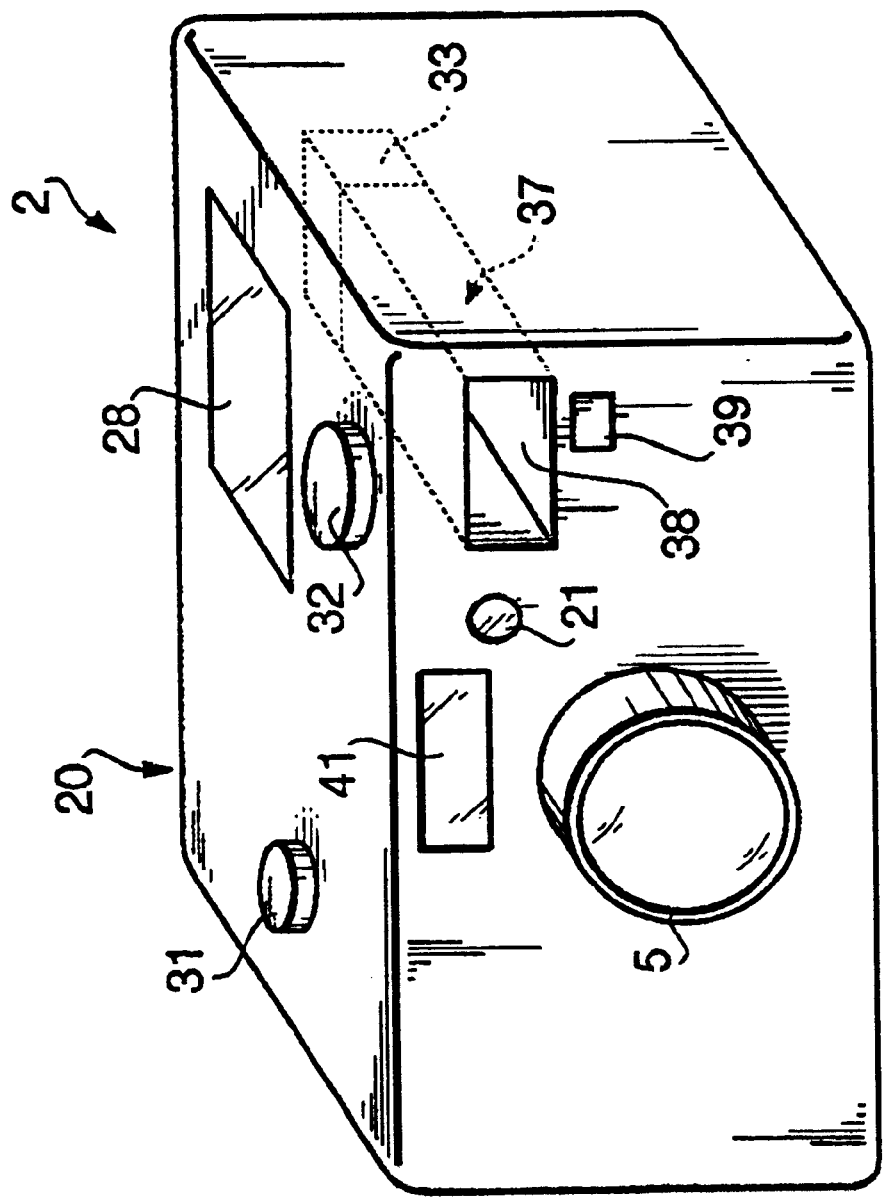
FIG. 1 is a perspective view of a still video camera according to an embodiment of the invention.
Figure 2:
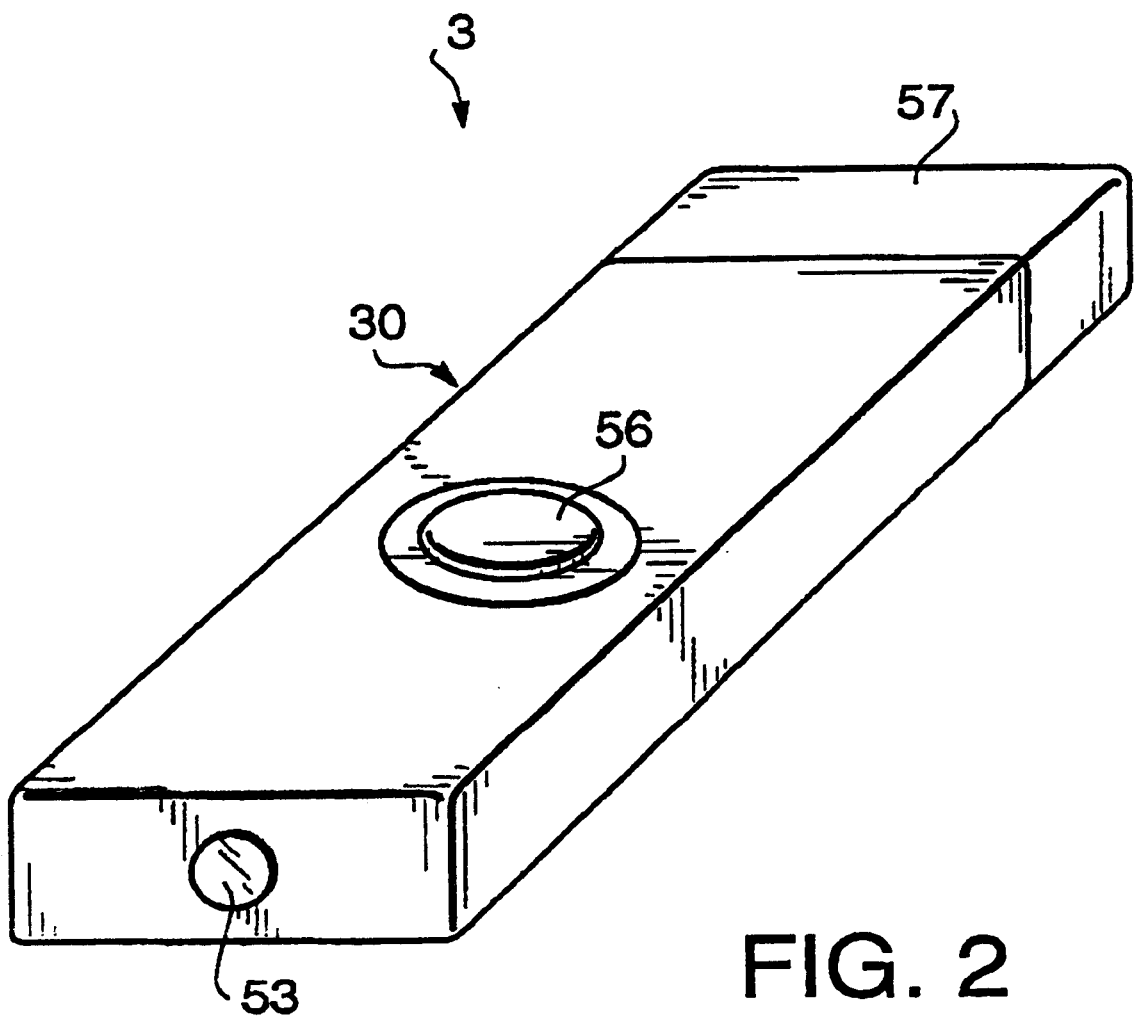
FIG. 2 is a perspective view of a remote controller for the camera shown in FIG. 1.
Figure 3:
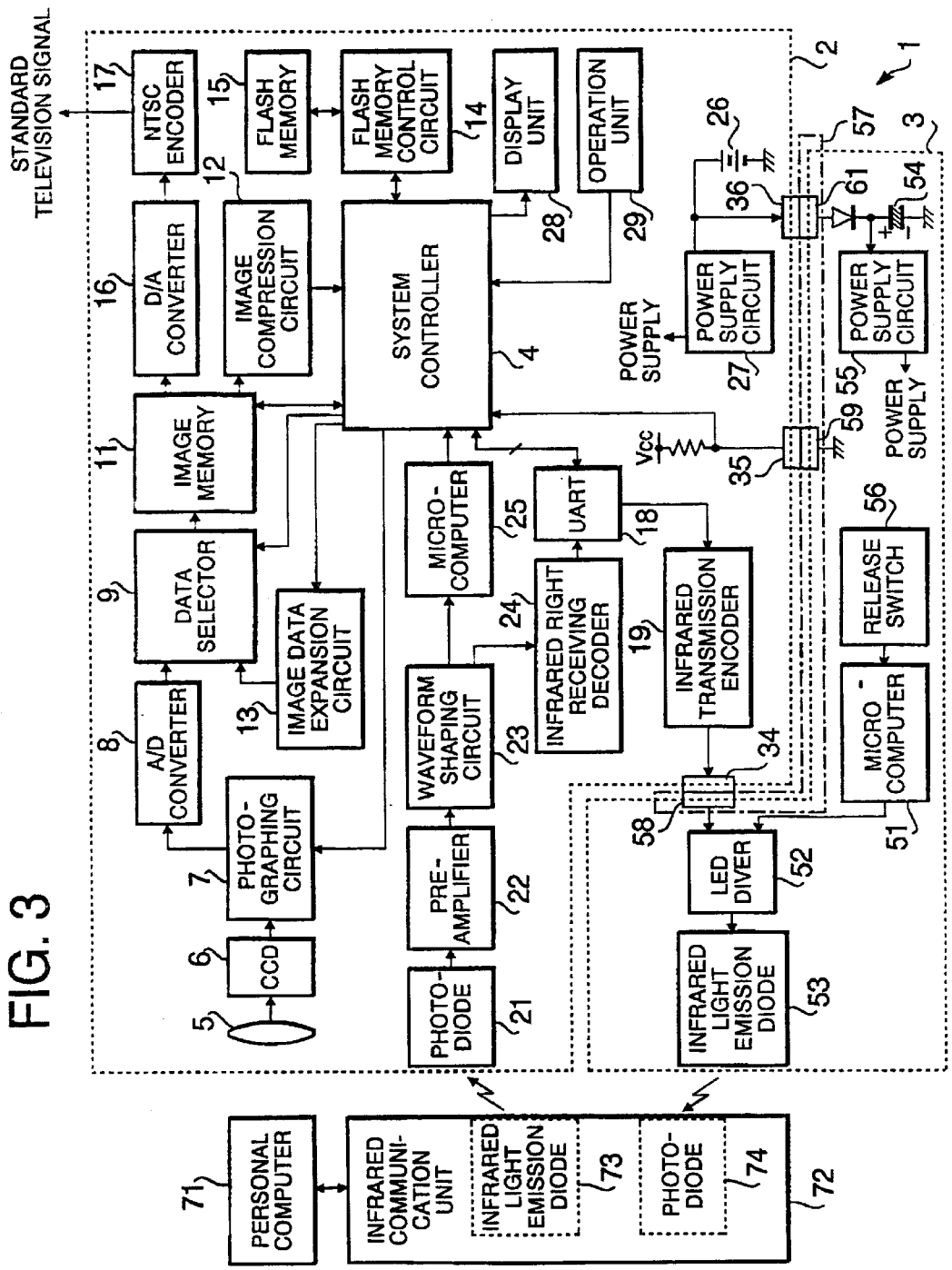
FIG. 3 is a block diagram of a still video camera system including the camera shown in FIG. 1 and the remote controller shown in FIG. 2.

FIG. 1 is a perspective view of a still video camera 2 according to a first embodiment of the invention, and FIG. 2 is a perspective view of a remote controller 3 for the still video camera shown in FIG. 1. FIG. 3 is a block diagram illustrating a control system of a still video camera system 1 including the still video camera 2 and the remote controller shown in FIGS. 1 and 2.

As shown in FIGS. 1 and 2, a still video camera system 1 includes the still video camera 2 and the remote controller 3.

As shown in FIG. 1, the still video camera 2 has a body 20. On a front surface of the body 20, a photographing optical system 5, a photo diode 21, and a remote controller ejection button 39 are provided. On a top surface of the body 20, a camera side release switch 31, a mode setting switch 32, and a display unit 28 are provided. Throughout the front surface to the rear surface of the body 20, a finder optical system 41 is provided.

On the body 20, a remote controller slot 37 to which the remote controller 37 is accommodated is formed. An opening 38 of the remote controller slot 37 is formed on the front surface of the body 20. On the bottom surface of the slot 37, a connector 33 which is to be connected with a remote controller connector 57 is provided.

As shown in FIG. 2, the remote controller 3 has a casing 30. On a front surface of the casing 30, an infrared light emitting diode 53 is provided. On the rear surface of the casing 30, the remote controller connector 57 is provided. On a top surface of the casing 30, a remote controller side release switch 56 is provided.

As shown in FIGS. 1 and 2, the photo diode 21 and the infrared emitting diode 53 are arranged to be directed substantially in the same direction when the remote controller 3 is accommodated in the slot 37.

The still video camera system 1 is capable of performing the photographing under the control of the remote controller 3, and further, image data of an object which was photographed can be transferred to an external device such as a personal computer through the remote controller 3 with use of an infrared communication method. When the infrared communication is executed between the still video camera 1 and the external device, i.e., when the image data is transferred from the still video camera system 1 to the external device, the remote controller 3 is to be accommodated in the slot 37.

As shown in FIG. 1, when the remote controller 3 is accommodated in the slot 37, firstly the remote controller 3 is held by hand and inserted through the opening 38, and further pushed after the remote controller 3 contacts the bottom of the slot 37, so that connection of the remote controller side connector 57 with respect to the camera side connector 33 is ensured.

It should be noted that, inside the camera body 2, a remote controller ejection mechanism is provided, which is driven upon operation of a remote controller ejection button 39 (located on the camera body 2)to eject the remote controller 3.

As shown in FIG. 3, the still video camera system 1 further includes a photographing unit having a CCD (Charge Coupled Device) 6, and a photographing circuit 7.

The CCD 6 is arranged behind the photographing optical system 5, and has a plurality of pixels arranged in a matrix. Each pixel accumulates an electrical charge. The electrical charge accumulated by the pixels are transferred sequentially.

The input terminals of the photographing circuit 7 are connected with the output terminals of the CCD 6, and reads out the signal out of the CCD 6, and performs various signal processing operations.

The still video camera 1 embodying the invention is for photographing a color image. In this connection, the CCD 6 is a color CCD provided with complementary color filters. Specifically, on each pixel of the CCD 6, a magenta (Mg), a yellow (Ye), a cyan (Cy) or a green (G) filter is provided. Since this type of filter is well-know, a further description will not be given. An object image is formed on the light receiving surface of the CCD 6 by the photographing optical system 5.

The still video camera 1 has a system controller 4. The system controller 4 includes, generally, a microprocessor, and controls various operations, such as an operation sequence of the still video camera 1, infrared communication, or the like.

An operation panel 29 and an indication unit 28 are also connected to the system controller 4.

The operation panel 29 is provided with various switches, such as a power switch (i.e., a main switch), a camera side release switch 31, a mode selection switch 32 and the like. The still video camera 1 operates in either a recording mode, a reproducing mode or a transmission mode. The mode is selected by operating the mode selection switch 32.

The display unit 28 includes a displaying device, such as an LCD (Liquid Crystal Display) or LED (Light Emitting Diode) to display various information, such as an ON or OFF status of the power switch, a currently selected operation mode, an OK or NG indication, which will be described in detail later, information of a year, date and time if necessary.

On the camera side connector 33, terminals 34, 35 and 36 are provided. Terminal 34 is connected to an infrared light transmission encoder 19. Terminal 35 is connected to the system controller 4, and the terminal 36 is connected to a power source 26.

The remote controller side connector 57 is provided with terminals 58, 59 and 61. Terminal 58 is connected to an LED driver 52. Terminal 61 is connected to a condenser 54 and a remote controller power supply circuit 55, and terminal 59 is grounded (i.e., connected to earth).

When the remote controller 3 is installed, i.e., when the camera side connector 33 and the remote controller side connector 57 are appropriately connected, terminals 34, 35 and 36 are electrically connected to terminals 58, 59 and 61, respectively.

Electrical power is supplied from the power source 26 to various circuits inside the camera body 2 via the camera side power supply circuit 27.

If terminal 35 of the connector 33 is connected to terminal 59 of connector 57, the power is supplied from the power source 26 to various circuits inside the remote controller 3 through the remote controller side power supply circuit 55, and further, power is supplied to the condenser 54, so that the condenser is charged.

If terminal 35 and terminal 59 are not connected, condenser 54 serves as a power source of the remote controller 3. That is, in such a case, power is supplied to respective circuits inside the remote controller 3 from the condenser 54 through the remote controller power supply circuit 55.

As described above, in the still video camera 1, the condenser 54 is used as the power source of the remote controller 3. Accordingly the remote controller 3 is capable of utilizing the power source inside the camera body 2. Therefore, the remote controller 3 does not require batteries.

A remote controller detection signal is input to the system controller 4.

When the camera side connector 33 and the remote controller side connector 57 are correctly connected, i.e., when terminal 35 and terminal 59 are electrically connected, terminal 35 is grounded. In this case, the remote controller detection signal is a logical LOW (L). If the connector 33 and the connector 57 are not connected appropriately, i.e., if terminals 35 and 59 are not connected, terminal 35 is not grounded, and thus the remote controller detection signal is a logical HIGH (H).

As described above, the system controller 4 recognizes whether the connectors 33 and 57 are appropriately connected (i.e., whether the remote controller 3 is coupled to the remote controller receiving portion 37) by detecting the remote controller detection signal. Further, by detecting charges of the status of the remote controller detecting signal from the logical HIGH (H) to the logical LOW (L), when the connectors 33 and 58 are connected (i.e., when the remote controller 3 is coupled to the remote controller receiving portion 37) is recognized.

According to the embodiment, an external device which performs the infrared communication with the still video camera 1 is a personal computer system having an infrared communication. The personal computer system includes a personal computer 71, and an infrared communication unit 72.

The personal computer 71 is provided with a memory for storing various data, such as image signal data and the like.

The infrared communication unit 72 has an infrared light emission diode 73 and a photodiode 74, which are provided on a front surface of the body of the infrared communication unit 72, and an infrared communication interface circuit, which is well known, and not shown, to be used for data communication utilizing the infrared light.

Operation of the still video camera 1 will be described below.

On each operation of the mode selection switch 32, the system controller 4 receives a recording mode set command, a reproducing mode set command, a deletion mode set command, and a transmission mode set command in this order, and selects the recording mode, the reproducing mode, the deletion mode, the transmission mode, also in this order. The selection of the mode upon operation of the mode selection switch 32 is cyclically executed, i.e., if the mode selection switch 32 is operated when the transmission mode is selected, the system controller 4 receives the recording mode set command, and selects the recording mode.

If the release switch 31 is turned ON when the recording mode is selected, the system controller 4 detects a recording trigger. Similarly, if the release switch 31 is turned ON when the reproducing mode, the deletion mode or the transmission mode is selected, the system controller 4 detects a reproducing trigger, a deletion trigger or a transmission trigger. Upon detection of the recording, reproducing, deletion or transmission trigger, a recording operation, a reproducing operation, a deleting operation or a transmission operation is executed.

Firstly, the recording mode is described.

If the release switch 31 is operated when the recording mode is selected, CCD 6 is exposed to light in accordance with a predetermined exposure condition, and an electrical charge corresponding to an object image formed on the light receiving surface of the CCD 6 is integrated. The integrated charge is transmitted to the photographing circuit 7.

The photographing circuit 7 processes the signal transmitted from the CCD 6, and an analog image signal, i.e., an analog brightness signal Y and an analog chromatic signal C representative of the object image is generated.

The analog signals Y and C are converted, by the A/D converter 8, into digital image signals, i.e., a digital brightness signal Y' and a digital chromatic signal C'. The digital signals Y' and C' are written in the image memory 11, at a predetermined address, as an image data through a data selector 9 which selectively receives data from the A/D converter 8 or a data expansion circuit 13. The system controller 4 controls the data selector 4 to select one of the A/D converter 8 or the data expansion circuit 13.

Then, from the predetermined address of the image memory 11, the digital image data is read.

The digital image data is compressed by an image data compression circuit 12 to have a predetermined data size, and is, through the system controller 4, transmitted to a flash memory control circuit 14. The flash memory control circuit 14 stores the compressed image data in a flash memory, or a rewritable non-volatile memory 15, at a predetermined address. Note that in the present embodiment, the flash memory 15 stores one frame of the image data.

If the photographing is executed with the remote controller 3, the remote controller 3 is positioned so that an infrared signal output from the remote controller 3 is incident to the still video camera 1.

When the release switch 56 of the remote controller 3 is turned ON, the microprocessor 51 controls the LED driver 52 to drive the infrared light emission diode 53 to emit light. Thus, when the release switch 56 is turned ON, the infrared light indicative of a turning ON operation is transmitted to the still video camera 1.

The infrared light emitted from the remote controller 3 is received by the photodiode 21 of the camera body 2, amplified by a pre-amplifier 22, transmitted to a waveform shaping circuit 23 in which the waveform is adjusted, and then transmitted to a received data decoder 24, and a microcomputer 25.

In the above case, the decoder 24 does not decode the received data when the data is transmitted from the waveform shaping circuit 23.

The microcomputer 25 generates a signal indicating that the release switch 56 of the remote controller 3 is turned ON based on the signal transmitted from the waveform shaping circuit 23.

The signal indicative of turning ON of the release switch 56 is transmitted to the system controller 4. The system controller 4 starts an exposure operation upon receipt of the signal indicative of turning ON of the release switch 56. The recording operation itself is similar to the operation when the release switch 31 is turned ON, and accordingly the description therefor is omitted.

Secondly, the reproducing mode will be described hereinafter.

If the release switch 31 is turned ON, the system controller detects the reproducing trigger and synchronously with the detection of the reproducing trigger, the system controller 4 initiates the reproducing operation.

In the reproducing operation, from the predetermined address of the flash memory 15, the digital image signal (i.e., the image data) is read by the flash memory control circuit 14. The digital image signal is transmitted to the data expansion circuit 14 through the system controller 4.

The digital image signal is expanded to the original image data by the data expansion circuit 13. The expanded image data is temporarily stored at a predetermined address in the image memory, through the data selector 9. Data selection of the data selector 9 is controlled by the system controller 4.

Then, the digital image signal is read out of the image memory 11, at the predetermined address.

The digital image signal is converted into an analog image signal by a D/A converter.16, and transmitted to an NTSC encoder 17. The NTSC encoder 17 generates a standard NTSC video signal based on the analog signal, i.e., the brightness signal Y and the chromatic signal C, and synchronizing signals which are generated by a synchronizing signal generating circuit (not shown). The video signal generated by the NTSC encoder 17 is input to a displaying device (not shown) such as an LCD or a CRT, and the image is reproduced.

If the release switch 31 is turned ON again, the system controller 4 detects the reproducing trigger again, and stops reproducing the image.

Thirdly, the deletion mode will be described.

When the release switch 31 is turned ON when the deletion mode is selected, the system controller 4 detects the deletion trigger, and starts the deletion operation.

The deletion operation is an operation in which the digital image signal stored in the flash memory 15 is deleted by the flash memory control circuit 14.

Lastly, the transmission mode will be described.

When data is transmitted, reproduction of the data is executed before the data is transmitted. As described before, when an image is reproduced, a digital image signal is stored in the image memory 11, When the data is transmitted, the remote controller 3 is inserted through the insertion opening 48, into the remote controller insertion section 37 so that the connector 57 of the remote controller 3 is connected to the connector 33, as shown in FIG. 3.

When the connector 57 and the connector 33 are appropriately connected, the remote controller detection signal is changed from logical H to logical L, as mentioned before. This change, i.e., the falling edge of the remote controller detection signal is detected, and the system controller 4 selects the transmission mode.

If the release switch 31 is turned ON in the transmission mode, the system controller 4 detects the transmission trigger, and upon detection of the transmission trigger, the system controller 4 starts the data transmission.

When the data transmission starts, the digital image signal stored in the image memory 11 is read out. The digital image signal read out of the image memory 11 is compressed by the image compression circuit 12 to have a predetermined size, and, via the system controller 4, transmitted to a UART (Universal Asynchronous Receiver Transmitter) 18.

The UART 18 converts the digital image signal, which is a parallel signal, into an asynchronous serial signal representative of UART frames.

The serial signal is transmitted to the infrared light transmitting encoder 19, at which the serial signal is converted (modulated) into a signal representative of IR frames. The IR frame signal is a signal according to an IrDA (Infrared Data Association) data transmission process. The IR frame thus generated is input to the LED driver 52.

Figure 4A:
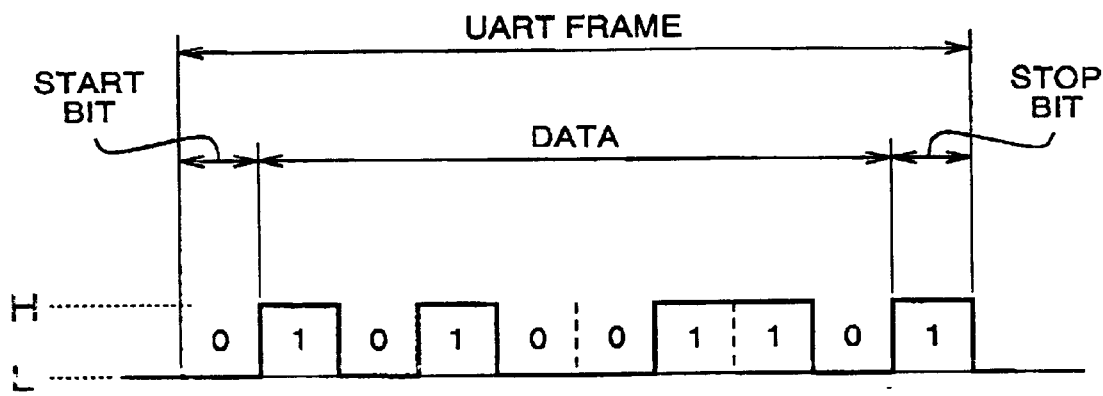
FIGS. 4A and 4B show a signal configuration of a UART frame and an IR frame.
Figure 4B:
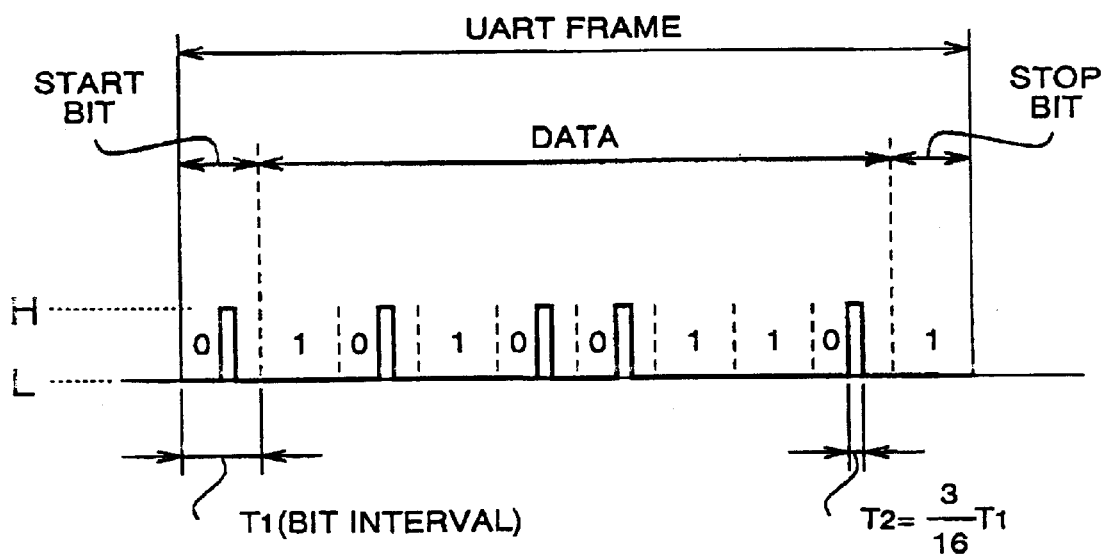

FIGS. 4A and 4B show timing charts illustrating a signal configuration of the UART frame and the IR frame.

As shown in FIG. 4A, the asynchronous serial signal (UART frame) includes a start bit "0", a stop bit "1", and "0"s and "1"s provided therebetween. In this embodiment, a value "0" corresponds to the logical high H of the signal, and a value "1" corresponds to the logical low L of the signal.

As shown in FIG. 4B, the IR frame in accordance with the IrDA method includes a start bit "0", a stop bit "1", and "0"s and "1"s provided therebetween. In this chart, a value "0" corresponds to the logical high H of the signal, and a value "1" corresponds to the logical low L of the signal. Further, an interval T2 between high level signals is expressed in the equation below:

$$T2 = 3T1/16$$

where, T1 is a period between bits.

Note that the infrared light is not emitted when the signal value is "1", and is emitted when the signal value is "0" for a duration of T2 by the infrared light emitting diode 53.

In the still camera 1, since the UART frame is modulated into IR frame, the duration of time during which the diode 53 emits light when the signal value is "0" is reduced to 3/16 times in comparison to the case when the UART frame is used, power consumption of the light emitting diode 53 can be reduced.

As shown in FIG. 3, the LED driver 52 operates in accordance with the signal transmitted from the infrared light transmission encoder 19, and drives the infrared light emitting diode 53 to emits the infrared light in accordance with a predetermined emitting pattern. Accordingly, the infrared light emitting diode 53 transmits the signal in accordance with the IrDA method.

The infrared light emitted by the diode 53 is received by the photodiode 74, and demodulated by the infrared communication interface circuit. With this process, the digital image signal is obtained and stored in a memory built in the personal computer 71.

The personal computer 71 determines whether the digital image signal is correctly obtained. If the digital image signal is read correctly, a signal indicating that the reading is successful is input in the interface circuit. If the digital image signal is not read correctly, a signal indicating the reading is not successful is input in the interface circuit. The interface circuit generates an IR frame signal corresponding to the signal transmitted from the interface circuit, and the infrared light emitting diode 73 is driven in accordance with the IR frame signal.

The IR frame signal thus emitted by the diode 73 is received by the photodiode 21 of the camera body 2, and amplified by the pre-amplifier 22. A waveform of the signal amplified by the pre-amplifier 22 is adjusted by the waveform shaping circuit 23, and then transmitted to the infrared light receiving decoder 24, and the microcomputer 25.

In this case, the microcomputer 25 does not operate when the signal is transmitted from the waveform shaping circuit 23.

The infrared light receiving decoder 24 demodulates the received signal (i.e., IR frame signal) into an asynchronous serial signal (i.e., UART frame signal).

The serial signal is transmitted to the UART 18 and converted into a parallel signal, and then, transmitted to the system controller 4.

The system controller 4 displays that the reading is successful or not successful with the display unit 28, in accordance with the signal transmitted from the UART 18.

The control operation of the system controller 4 will be further described hereinafter.

Figure 5:
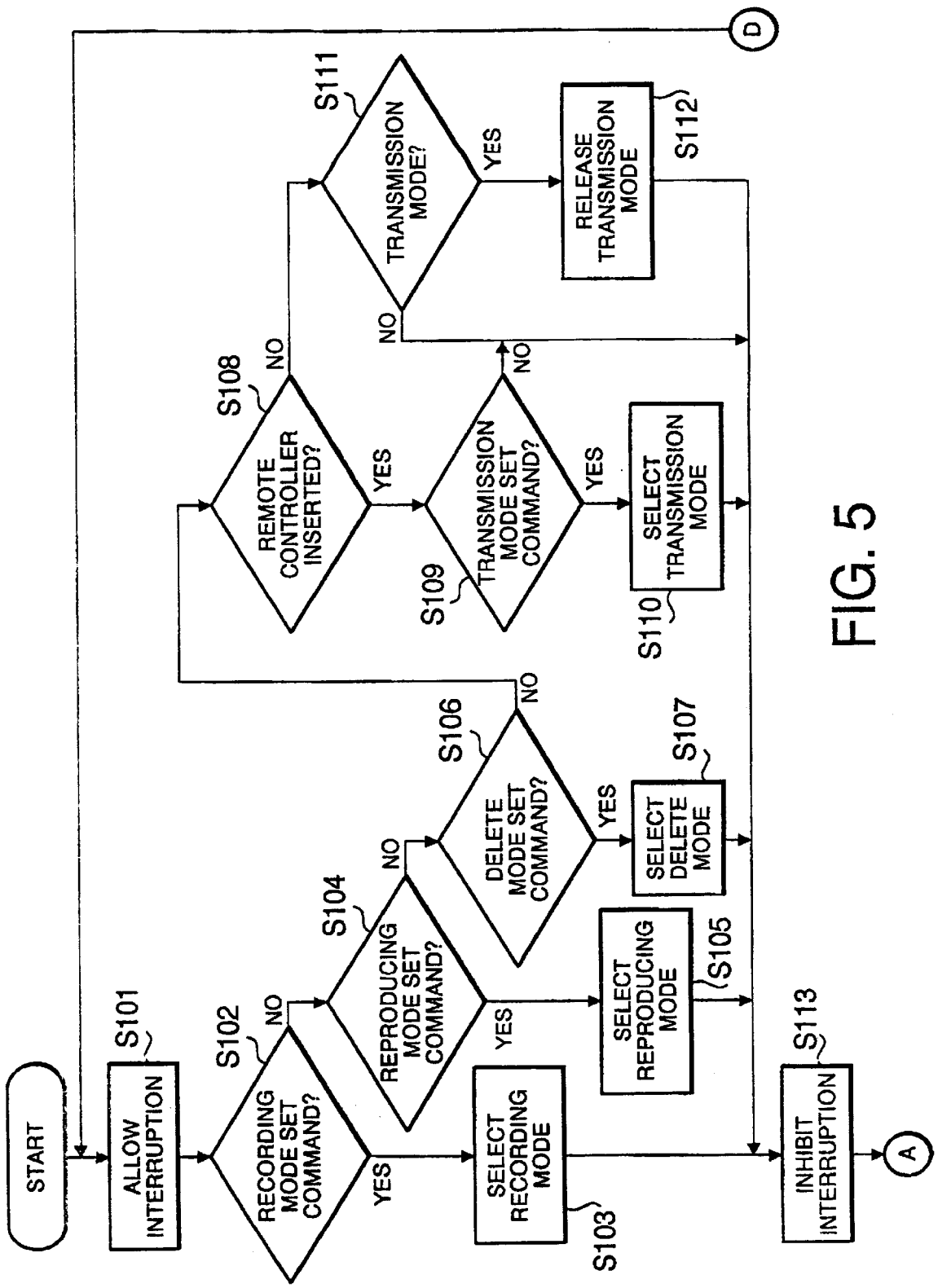
Figure 6:
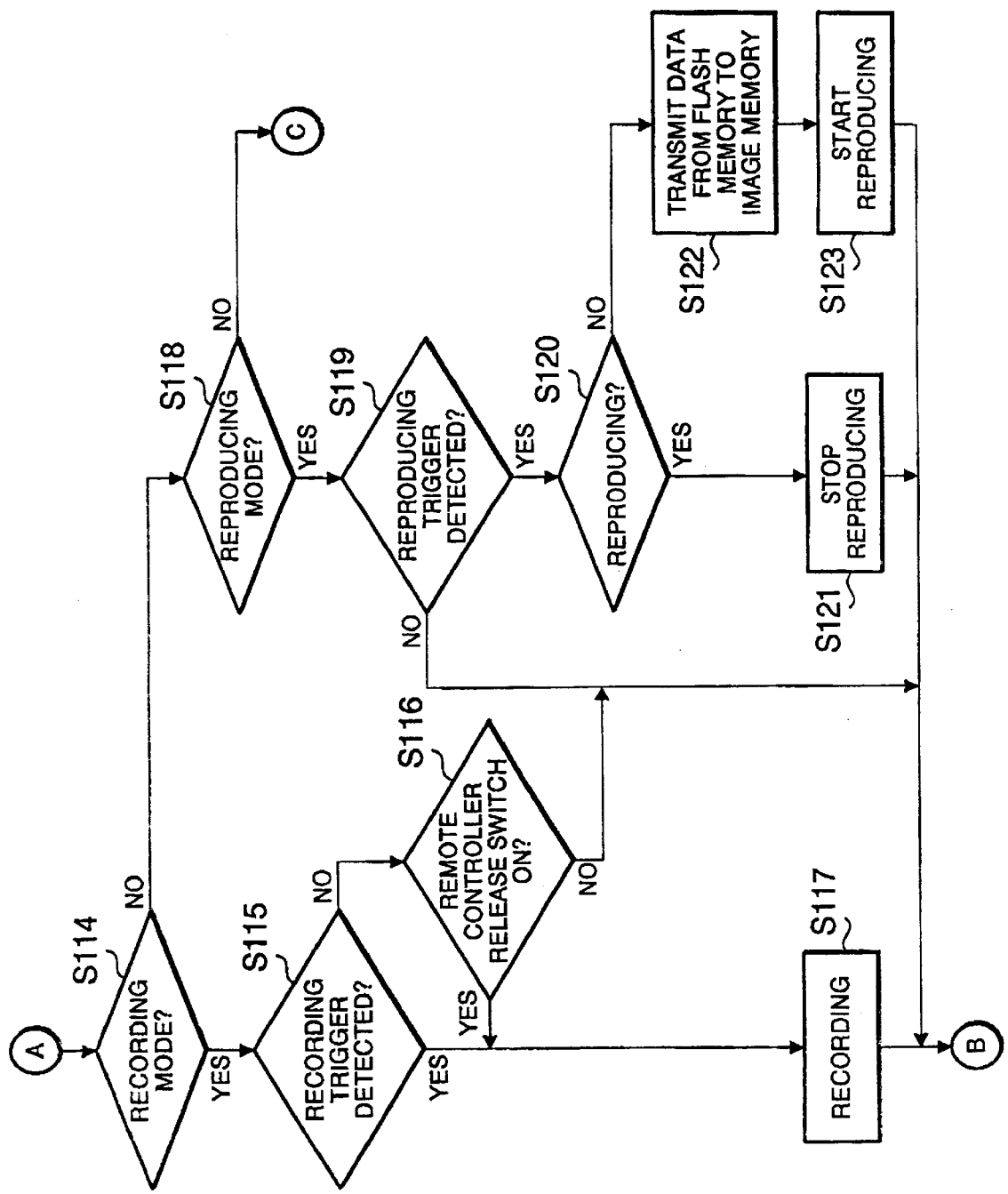

FIGS. 5, 6 and 7 show a flowchart illustrating a control process executed by the system controller 4.

At S101, an interruption operation, "REMOTE CONTROLLER INSERTION" is allowed to be executed. This interruption process is allowed between S101 and S113.

The "REMOTE CONTROLLER INSERTIONS" is illustrated in FIG. 8.

If the connector 57 and the connector 33 has been connected (i.e., if the remote controller is inserted) while the execution of the interruption "REMOTE CONTROLLER INSERTION" process is allowed, the remote controller detection signal is changed from a logical HIGH H to logical LOW L. When the system controller 4 detects this change, i.e., the falling edge of the remote controller detection signal, the "REMOTE CONTROLLER INSERTION" is executed.

In the "REMOTE CONTROLLER INSERTION" process, the system controller 4 sets the operation mode to the transmission mode (S201), and then the process returns to the main routine.

At Sl02, the system controller 4 determines whether the recording mode set command is received (S102). If the recording mode set command is received (S102:YES), the system controller 4 selects the recording mode (Sl03). If the recording mode set command is not received (S102:NO), the system controller 4 determines whether the reproducing mode set command is received (S104). If the reproducing mode set command is received (S104:YES), the system controller 4 selects the reproducing mode (S105). If the reproducing mode set command is not received (S104:NO), then the system controller 4 determines whether the deletion mode set command is received (S106). If the deletion mode set command is received (S106:YES), the system controller selects the deletion mode (S107). If the system controller 4 determines that the deletion mode is not received at S106, the system controller 4 determines whether the remote controller 3 is inserted, i.e., whether the connector 57 and the connector 33 are connected appropriately (S108).

Determination at S108 is executed such that if the remote controller detection signal is a logical LOW L, it is determined that the connectors 57 and 33 are appropriately connected; while if the remote controller detection signal is a logical HIGH H, it is determined that the connectors 57 and 33 are not connected appropriately.

If it is determined that the remote controller 3 is inserted at S108, i.e., if it is determined that the connectors 57 and 33 are connected appropriately, the system controller 4 determines whether the transmission mode set command is received (S109).

If it is determined that the transmission mode set command is received (S109:YES), the system controller 4 selects the transmission mode (S110). If it is determined that the remote controller 3 is not inserted (S108:NO), i.e., if it is determined that the connectors 57 and 33 are not connected correctly, it is determined whether the transmission mode is currently selected or not (S111).

If the currently selected mode is the transmission mode (S111:YES), the selection is released (S112). Thus, the operation mode is neutral, i.e., none of the recording, reproducing, delete and transmission modes is selected.

If it is determined that the transmission mode set command is not received at S109, and if it is determined at S11 that the currently selected mode is not the transmission mode, after a process of S103, S105, S107, S110 or S112 is executed, the REMOTE CONTROLLER INSERTION process is prohibited from being executed (S113).

Then, at S114, it is determined whether the recording mode is selected.

If the system controller 4 determines that the recording mode is selected, it is detected whether the recording trigger is detected (S115). If the recording trigger is not detected (S115:NO), the system controller 4 determines whether the release switch 56 is turned ON (S116).

If the release switch 56 is turned ON at S116, or if the recording trigger is received (S115:YES), photographing is executed and the image data is stored in the flash memory (S117) as mentioned before.

If it is determined that the currently selected mode is not the recording mode (S114:NO), it is determined whether the reproducing mode is selected (S118).

If the reproducing mode is selected (S118:YES), it is detected whether the reproducing trigger is detected (S119). If the reproducing trigger is detected (S119:YES), then the system controller 4 determines whether reproducing is currently executed (S120). The determination at S120 is made such that if the standard television signal is output from the NTSC encoder 17, it is determined that the reproducing is being executed, otherwise, the reproducing is not being executed.

If it is determined that the reproducing is being executed (S120:YES), reproducing is terminated (S121). If reproducing is not being executed (S120:NO), the system controller 4 reads out the image data from the flash memory 15, and transfer the read out image data to the image memory 11 (S122).

At S123, reproducing of an image is started.

At S118, if it is determined that the currently selected mode is not the reproducing mode (S118:NO), the system controller 4 determines whether the currently selected mode is the delete mode (S124).

If the currently selected mode is the delete mode (S124:YES), is determined whether the delete trigger is detected (S125).

If the delete trigger is detected (S125:YES), the image data stored in the flash memory 15 is deleted (S126). If it is determined that the currently selected mode is not the delete mode (S124:NO), it is determined whether the currently selected mode is the transmission mode (S127).

If the selected mode is the transmission mode (S127:YES), it is determined whether the transmission trigger is detected (S128). If it is determined that the transmission trigger is detected (S128:YES), the image data is read out of the image memory 11, and the system controller 4 transmits the image data with the infrared communication unit (S130).

If it is determined that the release switch 56 is OFF at S116, or if it is determined that the reproducing trigger is not detected at S119, or if it is determined that the deletion trigger is not detected at S125, or if it is determined that the transmission mode is not selected at S127, or if it is determined that the deletion trigger is not detected at S128, or if it is determined that no data is stored in the image memory at S129, then after S117, S121, S123, S126 or S130 is executed, process goes to S101, and above described process is executed again.

As described above, according to the still video camera 1, it is possible to transmit image data to an external device (peripheral device) such as the personal computer. Accordingly, all the image data as photographed can be recorded without using a removable recording media such as a memory card, the number of photographs, i.e., the number of image frames being unlimited. Therefore, it becomes possible to make a camera compact.

Further, communication is done with the infrared light, wiring is unnecessary and accordingly structure of the communication system becomes simple.

Furthermore, when the remote controller 3 is inserted, the operation mode is automatically changed to the transmission mode, thus the camera is easy to operate, and selection of the transmission mode is ensured.

With reference to FIG. 9, a second embodiment of the invention will be described hereinafter. Note that in the following description, the same reference numerals area assigned to parts used in the first embodiment, and description there of will be omitted.

Figure 10:
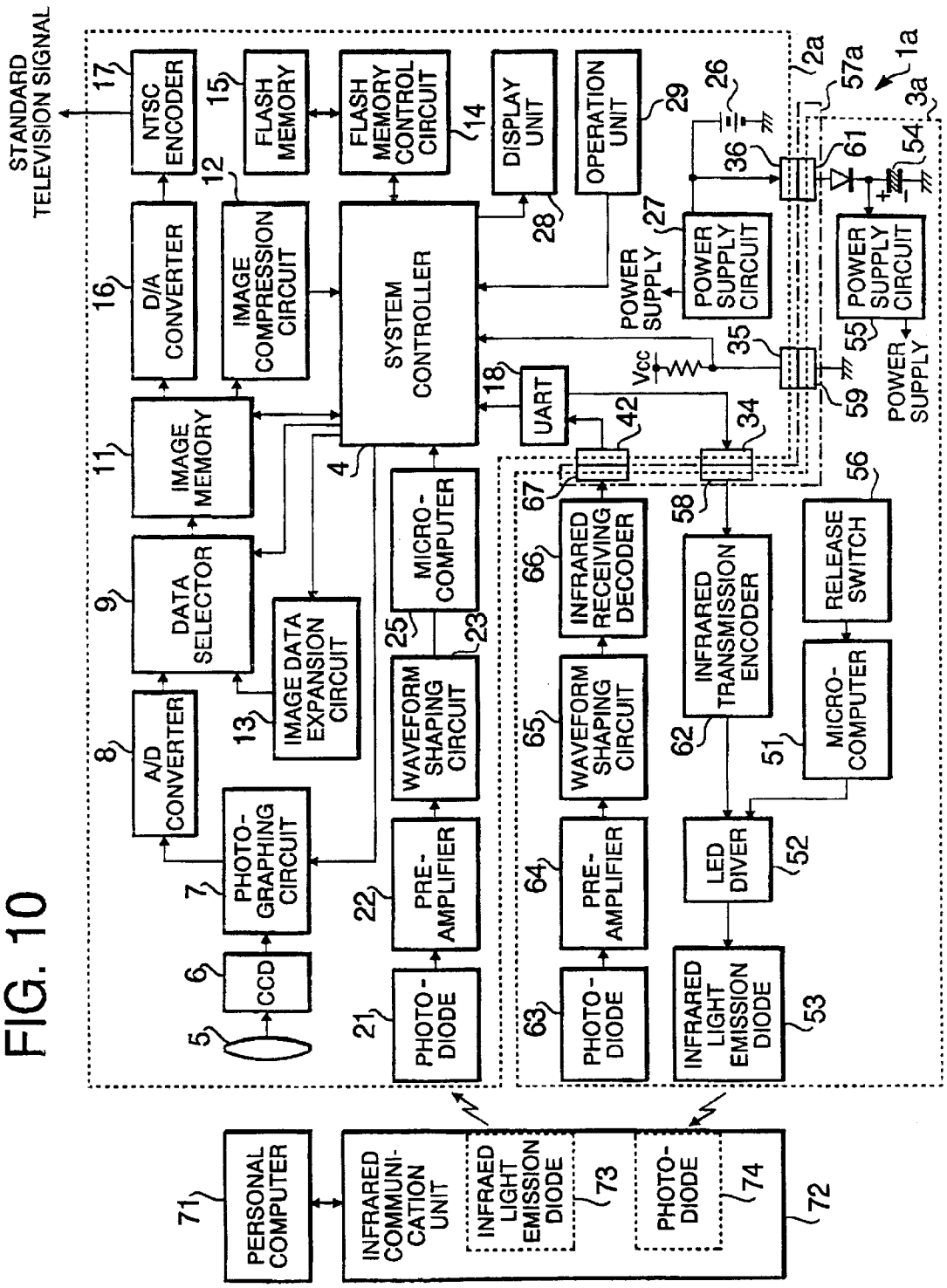
FIG. 10 is a block diagram of a still video camera system according to the second embodiment.

FIG. 9 is a perspective view of a remote controller 3a according to a second embodiment of the invention, and FIG. 10 is a block diagram showing the control system of the still video camera 1a according to the second embodiment.

As shown in FIG. 10, the still video camera 1a includes a camera body 2a and the remote controller 3a.

As sown in FIG. 9, the remote controller 3a includes a casing 30. On a front surface of the casing 30, the infrared light emitting diode 53, and a photodiode 63 are provided. On a rear end of the casing 30, a connector 57a is provided.

The camera body 2a does not have the infrared light transmission encoder, and infrared light receiving decoder. Instead, an infrared light transmission encoder 62 and an infrared light receiving decoder 66 are provided in the remote controller 3a.

Further, on the camera side connector 33, a terminal 42 is provided in addition to the terminals 34, 35 and 36. The terminals 34 and 42 are connected to the UART 18.

On the remote controller side connector 57a, in addition to the terminals 58, 59 and 61, a terminal 67 is provided. The terminal 58 is connected to the infrared light transmission encoder 62, and the terminal 67 is corrected to the infrared light receiving decoder 66.

In the second embodiment, the terminal 42 of the connector 33 corresponds to the terminal 67 of the connector 57a. In other words, when the connectors 33 and 57a are appropriately connected, the terminals 42 and 67 are electrically connected.

Operation of the still video camera 1a will be described below.

Operation in the recording, reproducing and delete mode is substantially similar to those in the first embodiment, and therefore description in theses mode is omitted. Operation in the transmission mode is different, and will be described hereinafter.

Similar to the first embodiment, the operation mode is changed by the mode selection switch 32. If the release switch 31 is turned ON while the transmission mode is selected, the transmission trigger is input to the system controller 4. The system controller 4 starts transmitting the data upon reception of the transmission trigger.

When the data transmission is executed, the image data is read out at the predetermined address of the image memory 11. The image data as read out is compressed by the image compression circuit 12 to have a predetermined data size, and transmitted to the UART 18 through the system controller 4.

The UART 18 converts the digital image signal from the parallel signal to the asynchronous serial signal (UART frame signal).

The serial signal (UART frame signal) is transmitted to the infrared light transmission encoder 62, at which the UART frame signal is converted into the IR frame signal and they transmitted to the LED driver 52.

The LED driver 52 drives the infrared light emitting diode 53 to emit the infrared light in accordance with the signal transmitted from the infrared light transmitting encoder 62. Thus, the infrared light emitting diode 53 emits infrared light carrying a signal based on the IrDA method.

The infrared light carrying the signal is received by the photodiode 74 of the infrared communication unit 72. The received signal is demodulated by the infrared communication interface circuit. With this process, the digital image signal is obtained. The digital image signal is then stored in a memory provided in the personal computer 71.

Next, the personal computer 71 determines whether the digital image signal is obtained correctly. If the reading out of the digital image signal is performed appropriately, a signal indicating that reading is successful is transmitted to the infrared communication interface circuit of the infrared communication unit 72. If the reading out of the digital image signal is performed inappropriately, the signal indicating that reading out of the image signal is not successful is transmitted to the infrared communication interface circuit of the infrared communication unit 72.

The signal indicative of successful or unsuccessful condition is converted into an IR signal based on the IrDA method in the infrared communication interface circuit, and the infrared light emission diode 73 is driven to emit IR frame signal.

The infrared light is received by the photodiode 21 of the camera body 2a, amplified by the pre-amplifier 22. Then, the waveform of the received signal is adjusted by the waveform shaping circuit 23, and input into the remote controller receiving microcomputer 25. However, the remote controller microcomputer 25 does not operate when the signal is transmitted from the waveform shaping circuit 23.

The infrared light receiving decoder 66 demodulates the signal (IR frame signal) transmitted from the waveform shaping circuit 65 into the asynchronous serial signal (UART frame signal).

The asynchronous serial signal is transmitted to the UART 18, at which covered into the parallel signal and then transmitted to the system controller 4.

The system controller 4 displays information related to the successful or unsuccessful on the display unit, based on the signal transmitted from the UART 18.

As described above, according to the still video camera 1a, the photographed image can be transmitted with use of the infrared communication as is done in the first embodiment.

Further, according to the second embodiment, it is not necessary that the camera main body is provided with circuits and/or parts particularly for transmitting the image data. Accordingly, the structure of the still video camera becomes simple, and manufacturing cost could be reduced.

Furthermore, the operation mode is automatically changed to the transmission mode upon insertion of the remote controller 3a. Accordingly, the mode setting to the transmission mode is done, the operation for data transmission is made easier, and further mode selection to the transmission mode is ensured.

The invention is not limited to the structure described with reference to the accompanying drawings.

For example, in each embodiment, the still video cameras 1 and 1a do not have a display device for monitoring the image photographed. However, it is possible that the still video cameras 1 and 1a have the display device, respectively. In such a case, the display may be an LCD, CRT, or the like.

Further, it is possible to arrange the flash memory to store more than one frame of image data.

Furthermore, the recording medium of the still video camera is not limited to the flash memory, but any kind of re-writable non-volatile memory, optical recording medium, magneto-optical recording medium, or magnetic recording medium.

Still further, the recording medium could be a removable medium with respect to the camera body, such as a memory card, instead of a built-in memory.

As described above, in the still video camera according to the invention, image data is transmitted with use of the data transmission system of the remote controller. In other words, some circuits and the like function as the data transmission system under a certain condition, the structure of the camera is simplified, and the manufacturing cost is reduced.

The present disclosure relates to subject matter contained in Japanese Patent Application No. HEI 08-148231, filed on May 17, 1996, which is expressly incorporated herein by reference in its entirety.

What is claimed is:

1. An image data processing system including an image data processing apparatus and a remote controller for controlling operation of said image data processing apparatus, said remote controller being detachable from and coupleable to said image data processing apparatus, said image data processing apparatus comprising:
a body;
a signal receiving device which receives at least one wireless control signal transmitted from said remote controller when said remote controller is detached from said image data processing apparatus; and
a data storage, which stores at least one image data;

said remote controller comprising:
a control button;
a transmitting portion; and
a wireless signal transmitting device, which transmits said at least one wireless control signal from said transmitting portion to said image data processing apparatus when said remote controller is detached from said image data processing apparatus,
wherein said image data processing apparatus further comprises a controller which controls said wireless signal transmitting device, based on said at least one image data stored in said data storage, to transmit a signal carrying said at least one image data to an external apparatus when said remote controller is coupled to said image data processing apparatus;
said body of said image data processing apparatus including an insertion slot that receives said remote controller such that said transmitting portion is exposed while said control button is not accessible, when said remote controller is coupled to said image data processing apparatus.

2. The image data processing system according to claim 1, said wireless signal transmitting device of said remote controller being oriented toward said signal receiving device of said image processing device to transmit said at least one wireless control signal to said image receiving device when said remote controller is detached from said image data processing apparatus, said wireless signal receiving device and said signal transmitting device facing in a same direction when said remote controller is coupled to said image data processing apparatus.

3. An image data processing system including an image data processing apparatus and a remote controller for controlling operation of said image data processing apparatus, said remote controller being detachable from and coupleable to said image data processing apparatus, said image data processing apparatus comprising:
a body;
a signal receiving device which receives at least one wireless control signal transmitted from said remote controller when said remote controller is detached from said image data processing apparatus;
a controller which controls operation of said image data processing apparatus in accordance with a signal received by said signal receiving device;
a data storage, which stores at least one image data;
data output terminals, through which said at least one image data stored in said data storage can be output, said remote controller comprising:
a control button;
a transmitting portion;
data input terminals; and
a wireless signal transmitting device, said wireless signal transmitting device transmitting a wireless signal carrying said at least one image data stored in said data storage from said transmitting portion to an external apparatus when said remote controller is coupled to said image data processing apparatus so that said data input terminals and said data output terminals are electrically connected, and said at least one image data is transmitted from said data output terminals through said data input terminals;
said body of said image data processing device including an insertion slot that receives said remote controller such that said transmitting portion is exposed while said control button is not accessible, when said remote controller is coupled to said image data processing apparatus.

4. The image data processing system according to claim 3, wherein said image data processing apparatus comprises a still video camera which captures an image of an object and stores an image data of said object in said data storage.

5. The image data processing system according to claim 4, wherein said wireless signal transmitting device is capable of transmitting said control at least one signal.

6. The image data processing system according to claim 4, wherein said remote controller includes a second signal receiving device, which receives signal transmitted from said external device.

7. The image data processing system according to claim 6, wherein said external device transmits a signal indicative of received status of said signal transmitted from said signal transmitting device.

8. The image data processing system according to claim 4, wherein said signal receiving device receives a signal indicative of a received signal status that is transmitted from said external device.

9. the image data processing system according to claim 4, wherein said still video camera is operable in one of a recording mode, a reproducing mode, and a data transmission mode in which said image at least one data is to be transmitted to said external device, and wherein said still video camera is provided with a manually operable member used to select one operation mode.

10. The image data processing system according to claim 9, wherein said still video camera is provided with a sensor which detects whether said remote controller is coupled to said still video camera, and wherein said controller selects said transmission mode when said sensor detects that said remote controller is coupled to said still video camera.

11. The image data processing system according to claim 9, wherein said still video camera is provided with a sensor which detects whether said remote controller is coupled to said still video camera, and wherein said controller inhibits a selection of said transmission mode when said sensor detects that said remote controller is not coupled to said still video camera.

12. The image data processing system according to claim 3, wherein said wireless signal receiving device receives an infrared light signal.

13. The image data processing system according to claim 3, wherein said signal transmitting device transmits an infrared light signal.

14. The image data processing system according to claim 3, said wireless signal transmitting device of said remote controller being oriented towards said signal receiving device of said image data processing device to transmit said wireless signal to said image data processing device when said remote controller is detached from said image data processing apparatus, said signal receiving device of said image data processing apparatus and said wireless signal transmitting device of said remote controller facing in a same direction when said remote controller is coupled to said image data processing apparatus.

15. A still video camera system, comprising:

a still video camera and a remote controller, said remote controller including a control button, a transmitting portion and a wireless signal transmitting device, said wireless signal transmitting device transmitting at least one wireless signal from said transmitting portion to control operation of said still video camera when said remote controller is detached from said still video camera, and a connector, said still video camera comprising a body having a memory for storing image data, and a receptor connector to which said connector of said remote controller is connectable, said still video camera system further comprising a data transmitting system which transmits data stored in said memory to an external device by way of said wireless signal transmitting device of said remote controller when said connector and said receptor connector are connected;

said body of said video camera system including an insertion slot that receives said remote controller such that said transmitting portion is exposed while said control button is not accessible, when said connector and said receptor connector are connected.

16. The still video camera system according to claim 15, said wireless signal transmitting device of said remote controller being oriented towards said data transmitting system of said video camera system to transmit said at least one wireless signal when said remote controller is detached from said still video camera, said signal transmitting device of said remote controller and said data transmitting system of said still video camera system facing in a same direction, when said connector and said receptor connector are connected.

* * * * *